ial, which wears away as the lining wears. The probe is made of an electrically conductive material having a relatively high bulk resistivity, so that as the lining wears, the resistance of the probe changes accordingly. The resistance of the probe can then be measured to determine lining wear.

United States Patent [19]
Howard et al.

[11] 3,958,445
[45] May 25, 1976

[54] PROPORTIONAL BRAKE LINING WEAR SENSOR

[75] Inventors: Donald W. Howard; Richard T. Burnett, both of South Bend, Ind.

[73] Assignee: The Bendix Corporation, South Bend, Ind.

[22] Filed: Aug. 30, 1973

[21] Appl. No.: 393,109

[52] U.S. Cl. .................................... 73/7; 188/1 A; 340/52 A
[51] Int. Cl.² ...................... B60T 17/22; G01N 3/56
[58] Field of Search .................... 73/7, 9; 340/52 A; 200/61.44; 188/1 A; 324/65, 64

[56] References Cited
UNITED STATES PATENTS

| | | | |
|---|---|---|---|
| 2,217,176 | 10/1940 | Madison | 340/52 A |
| 2,814,684 | 11/1957 | DePascale | 340/52 A |
| 2,981,929 | 4/1961 | Rizzo et al. | 340/52 A |
| 3,271,737 | 9/1966 | Benzemek | 340/52 A |
| 3,297,985 | 1/1967 | Trebonsky et al. | 340/52 A |
| 3,660,815 | 5/1972 | Rees | 200/61.44 X |
| 3,689,880 | 9/1972 | McKee et al. | 340/52 A |
| 3,755,774 | 8/1973 | Wilhelmi | 200/61.44 |

*Primary Examiner*—Donald O. Woodiel
*Assistant Examiner*—Daniel M. Yasich
*Attorney, Agent, or Firm*—Ken C. Decker; William N. Antonis

[57] ABSTRACT

A brake lining wear indicating system is disclosed. The system includes a probe, embedded in the lining material, which wears away as the lining wears. The probe is made of an electrically conductive material having a relatively high bulk resistivity, so that as the lining wears, the resistance of the probe changes accordingly. The resistance of the probe can then be measured to determine lining wear.

5 Claims, 8 Drawing Figures

PROPORTIONAL BRAKE LINING WEAR SENSOR

BACKGROUND OF THE INVENTION

This invention relates to a brake lining wear sensing probe.

Heretofore, inspection of a vehicle's brakes was required to determine if the linings had worn sufficiently to require replacement. This is a relatively cumbersome procedure, and requires that the wheel and hub assembly be removed. Since this cannot be done quickly, the brake linings on most vehicles are inspected only once or twice a year. It is clearly desirable that some way be provided to inspect the linings without removing the wheel and hub assembly. It has been proposed to provide a probe in the brake linings which actuates a warning device when the linings have worn to a predetermined level. However, prior art devices have been designed to actuate a warning device only after the linings have become dangerously worn, and they cannot provide an indication of the lining remaining prior to its having worn to the critical level.

SUMMARY OF THE INVENTION

Therefore, an important object of our invention is to provide a brake lining wear probe which can be used to determine the lining remaining at any time during the life of the lining.

Another important object of our invention is to provide a probe which is made of a resistance material which wears away as the lining wears, whereby the resistance of the probe is indicative of the lining remaining.

Still another important object of our invention is to provide a brake lining wear probe which is adapted to be used with automotive diagnostic equipment to determine the amount of lining wear.

A further object of our invention is to provide a brake lining wear probe which provides indication of lining wear as discrete increments of the lining material are worn away.

DETAILED DESCRIPTION

Figure 1:
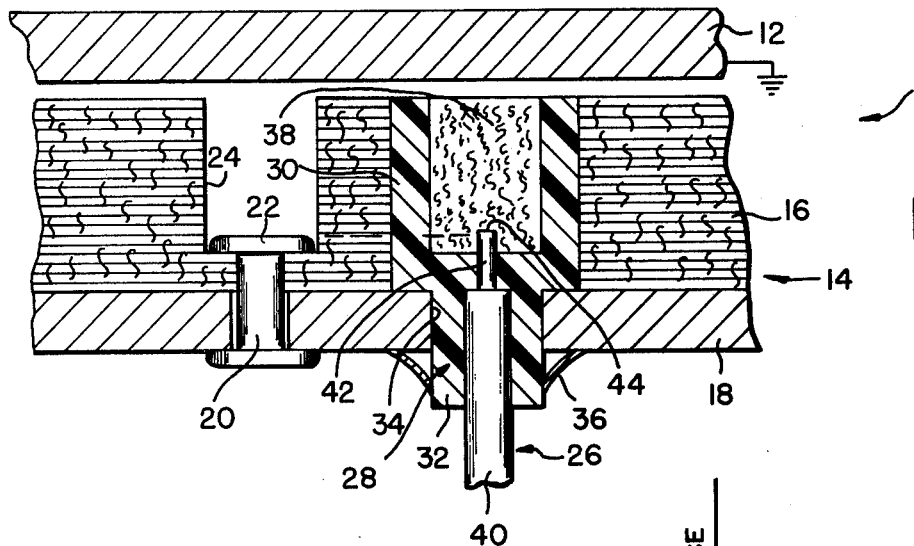
FIG. 1 is a fragmentary, cross-sectional view taken through a brake shoe having a probe made pursuant to the teachings of our present invention.

Referring now to the drawings, a brake assembly generally indicated by the numeral 10 includes a member 12 to be braked and friction member generally indicated by the numeral 14. The member 12 to be braked is mounted for rotation with one of the vehicle's wheels, and represents the brake drum in a vehicle equipped with drum brakes and represents the brake rotor or disc in a vehicle equipped with disc brakes. The friction member 14 corresponds to the brake pad in a disc brake vehicle and to the brake shoe in a vehicle equipped with drum brakes. Friction member 14 includes a friction lining 16 which is mounted on a support or backing plate 18 by a rivet 20. The rivet 20 includes a head 22 which is recessed from the surface of the lining 16 in a cavity 24. As is well known to those skilled in the art, during a brake application, the lining 16 is urged to frictional engagement with the member 12 to thereby retard rotation of the latter. As is also well known to those skilled in the art, repeated engagement of the lining 16 with the rotating member 12 results in wear of the lining material 16. When the lining material 16 wears to an extent that the head 22 of the rivet 20 nearly engages the member 12 during a brake application, the lining 16 must be replaced. However, in existing vehicles there is no convenient way of determining when the lining has worn to such an extent that replacement is necessary. Indeed, it is necessary to completely dismantle the brake drum and corresponding hub in drum brake-equipped vehicles, and to remove the wheel in vehicles equipped with disc brakes. Therefore, it is desirable to provide some method of determining when the linings have worn dangerously. To provide such an indication, a probe generally indicated by the numeral 26 is carried by the support member 18. The probe 26 includes a plastic housing 28 which includes a cup-shaped portion 30 which is embedded in the lining material 16 and a projection 32 which extends through an opening 34 in the support member 18. A gripping ring 36 secures the probe 26 to the backing plate 18. The cup-shaped portion 30 is filled with an electrically conductive material having a high bulk resistivity generally indicated by the numeral 38. Although any such material is suitable for this purpose, electrical resistors are customarily made from carbon compounds well known to those skilled in the art, and such carbon compounds are well adapted to be used in the probe 26. Since the nature of these carbon compounds are well known to those skilled in the art, and since many different compounds may be used with equal success in the instant invention, they will not be described in detail herein. However, it is preferable that the carbon compounds be mixed with brake lining material and then used to fill the cup-shaped portion 30, so that the material 38 will have similar thermal expansion characteristics as does the lining 16. An electrical lead 40 having a metallic conductor enclosed by suitable insulation is carried in the projection 32 and includes an electrical conductor 42, one end 44 of which is in electrical contact with the resistance material 38. The lead 40 is also connected to a circuit which will be described hereinafter which actuates a warning light in the driver's compartment. As can be seen from FIG. 1 of the drawings, the end 44 of the lead 40 extends into the material 38 a distance slightly greater than the head 22 of the rivet 20.

Figure 2:
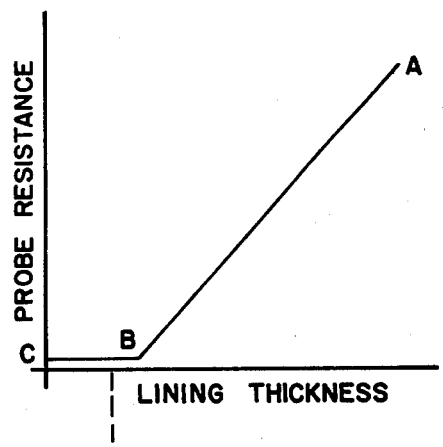
FIG. 2 is a graphical representation of the change in electrical resistance of the probe illustrated in FIG. 1 as the lining wears.

The electrical resistance of the circuit path between end 44 of the conductor 42 and the grounded member 12 during a brake application is given by the following formula, where R equals the resistance, ρ equals the resistivity of the material 38, L is the length of the circuit path between the end of the end 44 of the conductor 42 and the member 12, and A is the cross-sectional area of the material 38: $R = \rho L/A$. As pointed out hereinabove, the material 38, the lining 16, and the cup-shaped portion 30 will all wear away during repeated brake applications. Since the area A, and resistivity ρ, of the probe illustrated in FIG. 1 remain constant as the lining 16 wears, the resistance of the circuit path between the end 44 and the conductor 42 and the member 12 during braking will decrease linearly, as illustrated by line A-B in FIG. 2, where point A represents the resistance of the probe when the linings are new, as illustrated in FIG. 1. The point B represents the state of lining wear wherein the friction lining 16 has worn to the extent that the end 44 of the conductor 42 is brought into engagement with the member 12. Since conductor 42 is of relatively low resistivity, the resistance of the circuit path drops to a low value which remains constant as illustrated by line B-C in FIG. 2. As pointed out hereinabove, the end 44 extends into the material 38 a distance just beyond that of the head 22 of the rivet 20, so that just before the lining wears sufficiently to engage the head 22 of the rivet 20, the resistance of the probe will have dropped to the value corresponding to line B-C in FIG. 2. As will be described hereinafter, the circuit disclosed in FIG. 7 of the instant application actuates a driver warning light when the end 44 of the conductor 42 is brought into engagement with the member 12.

Figure 3:
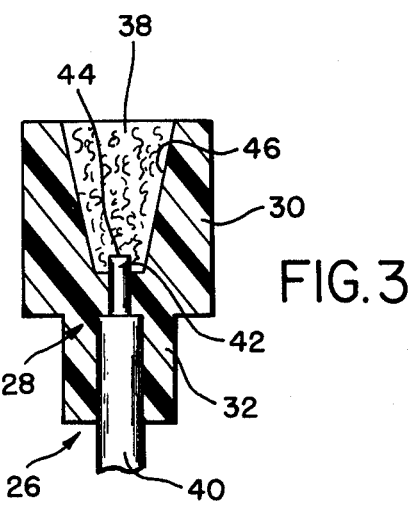
FIG. 3 is a cross-sectional view of an alternate embodiment of the probe illustrated in FIG. 1.
Figure 4:
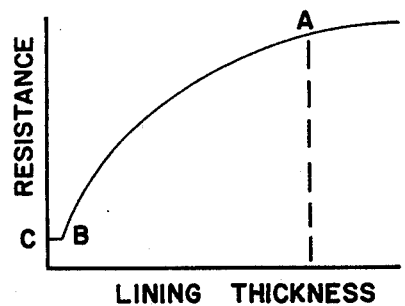
FIG. 4 is a graphical representation of the change in electrical resistance of the probe illustrated in FIG. 3 as the lining wears.

It is sometimes desirable to have a probe wherein the change of resistance of the circuit path between the conductor 42 and the member 12 does not decrease uniformly as the lining wears. For example, it may be desirable that the resistance decreases at a rather gradual rate while the lining is new, but that the resistance decreases at a relatively rapid rate when the lining has worn. The embodiment of FIG. 3 discloses such a probe, wherein elements the same as those in the embodiment of FIG. 1 retain the same reference characters. The probe of FIG. 3 is identical to the probe 26 in FIG. 1, except that the edges 46 of the cup-shaped portion 30 of the housing 28 are tapered, so that the area of the resistance material 38 which engages the member 12 during a brake application is constantly decreasing. Since, in the equation given above, the resistance is inversely proportional to the effective area, a large area will result in a rather gradual decrease in circuit resistance as the lining wears, while a smaller area engaging the member 12 will result in a relatively rapid decrease in resistance. The tapered sides 46 provide an initial relatively large area and a relatively small terminal area, resulting in the curve A-B-C in FIG. 4, which indicates the variance of resistance as lining thickness decreases, where A represents the resistance for a new lining, and B represents the resistance of the lining when the end 44 of conductor 42 first engages the member 12.

It may also be desirable to provide a probe in which the resistance of the circuit through the probe between the tip of conductor 42 and the member 12 decreases in multiple steps. For example, a test instrument might provide a series of lights, each additional light being actuated as the lining is worn by an additional "step".

Figure 5:
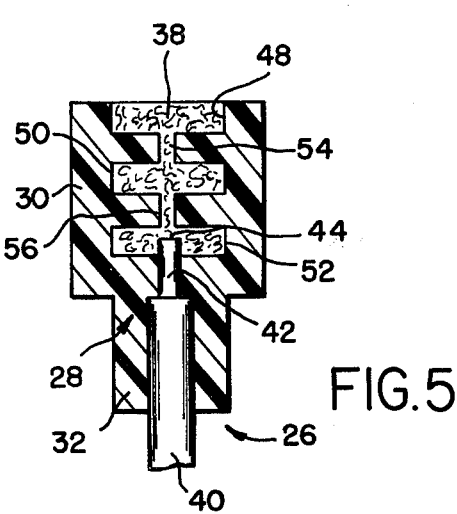
FIG. 5 is a cross-sectional view of another alternate embodiment of the probe illustrated in FIG. 1.
Figure 6:
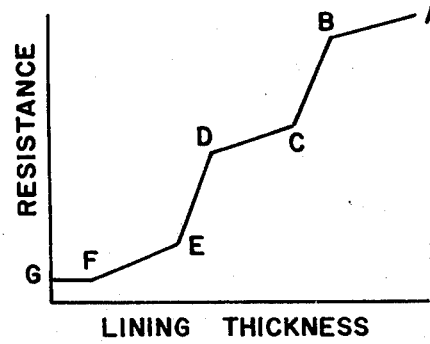
FIG. 6 is a graphical representation of the change in electrical resistance of the probe illustrated in FIG. 5 as the lining wears.

Such a probe is illustrated in FIG. 5, wherein the cup-shaped member 30 is provided with sections 48, 50, and 52 of relatively large cross-sectional area and sections 54 and 56 of relatively small cross-sectional area. Each of the sections 48,56 are filled with the resistance material described hereinabove. However, the cross-sectional area of the sections 48, 50 and 52 is much greater than that of the sections 54 and 56. According to the equation given hereinabove, the change in resistance of the circuit path between the tip 44 of the conductor 42 and the member 12 will decrease less rapidly as the probe wears through the sections 48, 50, and 52, and will decrease more rapidly as the probe wears through the sections 54 and 56, since, as pointed out hereinabove, the resistance of the aforementioned circuit path is inversely proportional to the cross-sectional area. Therefore, referring to FIG. 6, the resistance will decrease relatively gradually as represented by line A-B as the probe wears through the larger cross-sectional area 48, will increase much more rapidly as indicated by line B-C as the probe wears through the section 54, will decrease more gradually as represented by lines C-D as the probe wears through Section 50, and the resistance will decrease similarly as the probe wears through section 56 and 52. Again, when the probe wears sufficiently such that the tip 44 of conductor 42 engages the member to be braked 12, the resistance decreases to a relatively low stable level illustrated by line F-G in FIG. 6.

Figure 7:
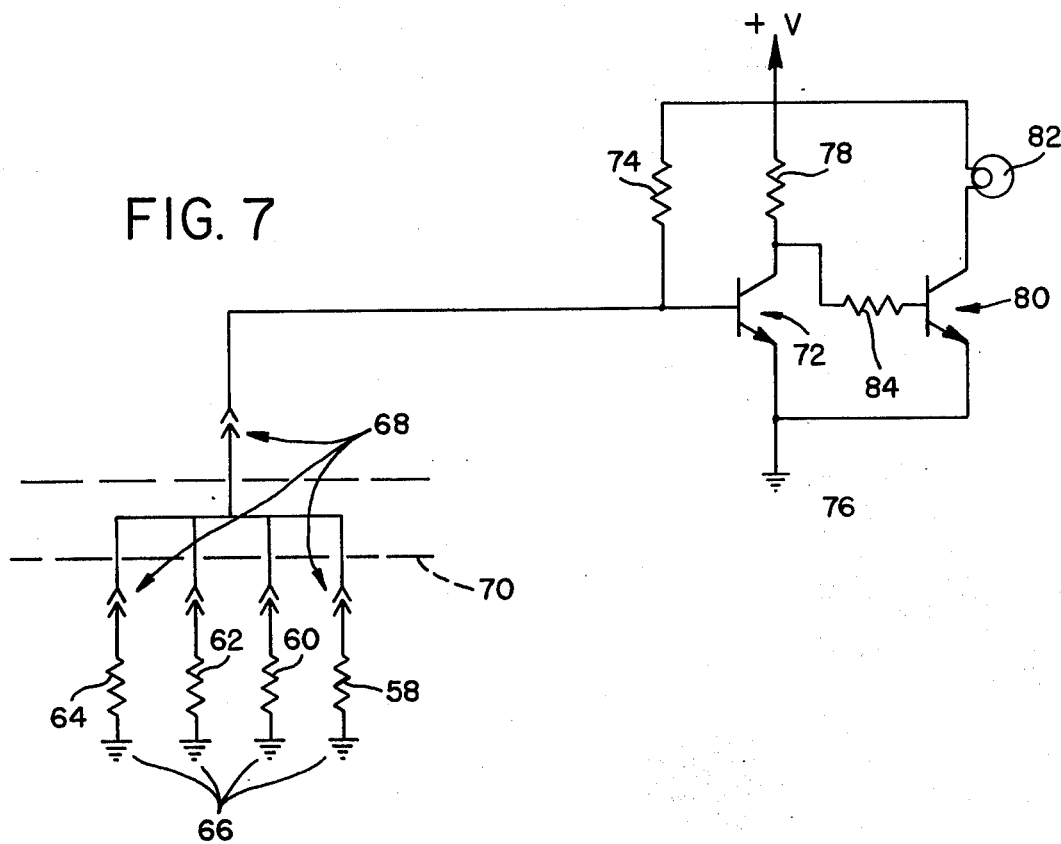
FIG. 7 is a circuit diagram of a circuit for use with any one of the probes illustrated in FIGS. 1, 3, and 5 which actuates a warning light when the resistance of a corresponding probe drops below some predetermined level.

The circuit illustrated in FIG. 7 is adapted for use with any of the probes disclosed in FIGS. 1, 3, and 5, to actuate the driver warning light when the brake linings have worn dangerously thin. Probes for each of the four wheels of the vehicle are represented by numerals 58, 60, 62, and 64, and are connected to an electrical ground as at 66 when the corresponding friction elements are urged against corresponding members to be braked during a brake application. Each of the probes 58, 64 are connected in parallel to a fire wall connector generally indicated by the numeral 68 which is mounted on the fire wall 70 of the vehicle. The common output of the connector 68 is connected to the base of a transistor 72 and also through a resistor 74 to a voltage source +V. The transistor 72 is connected between a ground as at 76 and the voltage +V through another resistor 78. Another transistor 80 is connected between a warning light 82 mounted in the vehicle operator's compartment and the electrical ground 76. The base of the transistor 80 is connected to the voltage source +V through the resistors 78 and 84. Therefore, when all of the brake linings are new, the parallel resistance of the probes 58 through 64 will be high enough to maintain the base of the transistor 72 at a relatively high value, so that the transistor 72 will be turned on, thereby connecting the resistor 78 to the ground 76, so that the base of the transistor 80 will be at a relatively low potential. The light 82, therefore, will remain off. However, if one of the linings should wear much more rapidly than the other linings, such that the tip 44 of the conductor 42 should engage the member 12, the resistance of the circuit path through this lining will be so low that the resistance of the other probes connected in parallel with it may be effectively ignored. The base voltage on the transistor 72 will therefore be lowered, turning the transistor 72 off and abruptly increasing the voltage on the base of transistor 80, thereby turning the latter on to actuate the warning light 82. If all of the linings 58, 64 wear evenly, the parallel resistance of the probes will be low enough to turn the transistor 72 off just before the tip 44 of the corresponding conductors 42 is brought into engagement with the corresponding members 12.

Figure 8:
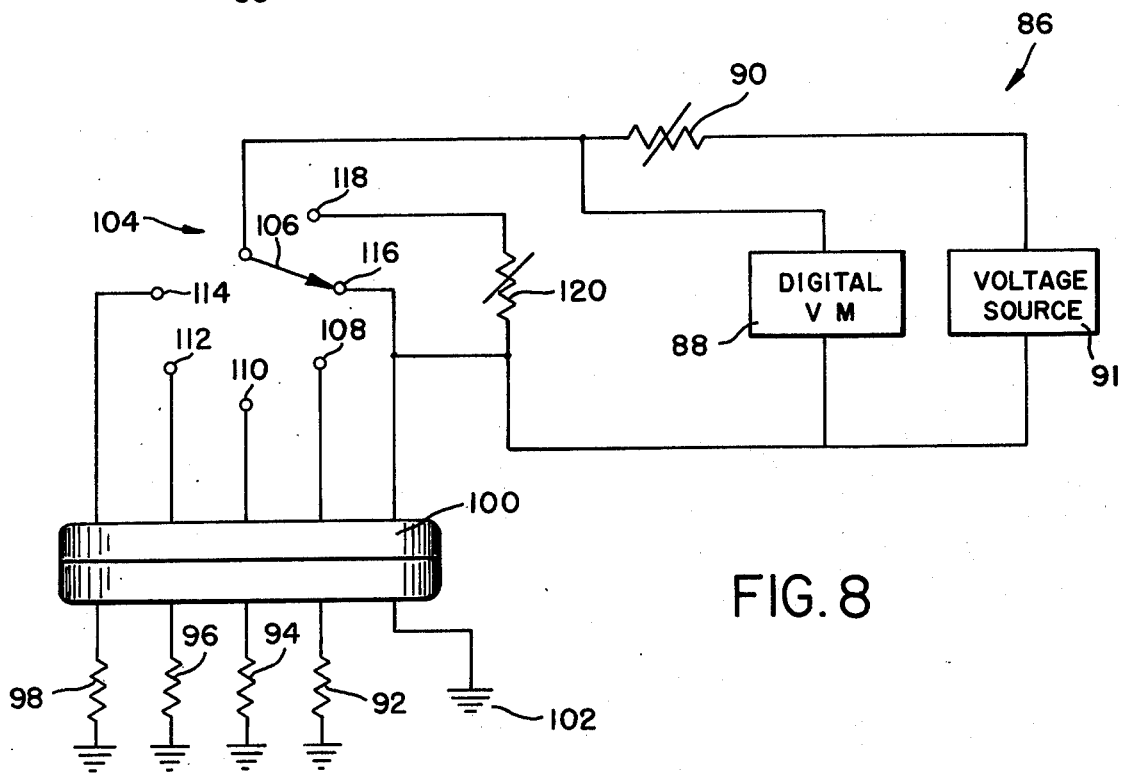
FIG. 8 is a schematic illustration of a separate diagnostic instrument which may be used at periodic intervals to measure the resistance of the probes to thereby determine the amount of the lining remaining.

An automobile diagnostic instrument generally indicated by the numeral 86 in FIG. 8 would normally be available at a service center or automobile diagnostic clinic and may be used to determine the exact amount of lining remaining on each of vehicle's brake shoes. The instrument 86 includes a voltmeter 88 connected in parallel with a voltage source 91 and a scale adjustment resistor 90. Probes 92, 94, 96, and 98 on each of the vehicle wheels are connected to the diagnostic instrument 86 through a standard connector 100, which also provides a connection with a vehicle ground as at 102. The connector 100 is also connected to switching mechanism 104 which includes a rotating switch element 106 which is movable between terminals 108, 110, 112, and 114 which are connected to the probes 92, 98, respectively; and a terminal 116 which is connected directly to the vehicle ground as at 102, and to a terminal 118 which is connected to the vehicle ground through a variable resistor 120. To determine the lining thickness on each of the vehicle brakes, the switch are 106 is first moved. to the terminal 116 and the scale adjustment 90 adjusted to set the voltmeter 88 to zero. The switch on 106 is next moved to the terminal 118, and the resistor 120 is then adjusted to a value representing a new brake lining and the reading on the voltmeter 88 is noted. The switch arm 106, is next moved in turn to the terminals 108, 110, 112, and 114, and the values of the resistances of each of the probes 92, 98 are read as a percentage of the resistance established by the resistor 120 of an unused lining. In this matter, the exact percentage of the lining remaining may be determined.

We claim:
1. In a brake:
a member to be braked connected to an electrical ground;
a friction member having a lining for engagement with said member to be braked and a support carrying said lining;
probe means carried by said friction member and including an electrically conductive material having a relatively high resistivity carried in said lining and extending therethrough continuously from the edge of the lining engaging the member to be braked toward said support, the transverse cross-sectional area of said resistance material intermediate the edges of said lining being non-uniform, and a conductor carried by said support and electrically connected to said conductive material, said conductive material defining a circuit path between said conductor and the member to be braked, whereby the resistance of the circuit path between said terminal and the member to be braked during engagement of said lining with the latter will decrease as said material is worn away as the lining wears, said conductor projecting into said electrically conductive material so that the end of the conductor will engage said member to be braked when said lining is worn a predetermined amount, the transverse cross-sectional area of the resistance material tapering from a maximum cross-sectional area at the edge of the lining adapted to engage the member to be braked to a minimum cross-sectional area at the end of said conductor;
a warning device; and
circuit means for applying a voltage across said probe when the lining is engaged with the member to be braked and actuating said warning device when the voltage drop across said probe drops below a predetermined level.

2. In a brake:
a member to be braked connected to an electrical ground;
a friction member having a lining for engagement with said member to be braked and a support carrying said lining;
probe means carried by said friction member and including an electrically conductive material having a relatively high resistivity carried in said lining and extending therethrough continuously from the edge of the lining engaging the member to be braked toward said support, the transverse cross-sectional area of said resistance material intermediate the edges of said lining being non-uniform, and a conductor carried by said support and electrically connected to said conductive material, said conductive material defining a circuit path between said conductor and the member to be braked, whereby the resistance of the circuit path between said terminal and the member to be braked during engagement of said lining with the latter will decrease as said material is worn away as the lining wears, said conductor projecting into said electrically conductive material so that the end of the conductor will engage said member to be braked when said lining is worn a predetermined amount, said resistance material having a larger transverse cross-sectional area and a smaller transverse cross-sectional area, said larger and smaller areas alternating so that as said lining material wears, the resistance of said probe changes abruptly as said probe wears by predetermined amounts.

3. The invention of claim 2:
a rivet securing said lining to said support, the head of said rivet being recessed from the edge of the lining adapted to engage the member to be braked, the end of said conductor projecting into said conductive material a distance greater than that of the head of said rivet.

4. The invention of claim 2:
said probe including a cup-shaped member within said lining containing said conductive material, said cup-shaped member including a projection extending through said support means securing said cup-shaped member to said support, said member supporting said conductor, and an electrical lead extending through said projections carrying said conductor.

5. The invention of claim 2; and
test means for connection to said probe to measure the lining wear, said test means including a voltage source connected across said probe and a voltmeter connected in parallel with said voltage source and said probe.

* * * * *